(12) United States Patent
Muraki et al.

(10) Patent No.: US 6,293,702 B1
(45) Date of Patent: Sep. 25, 2001

(54) ROLLING BEARING

(75) Inventors: Hiromitsu Muraki; Hiroshi Tani; Takashi Seshimo; Toru Takamizawa, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/494,422

(22) Filed: Jan. 31, 2000

(30) Foreign Application Priority Data

| Jan. 29, 1999 | (JP) | 11-022127 |
| Feb. 4, 1999 | (JP) | 11-027469 |
| Feb. 17, 1999 | (JP) | 11-038896 |
| Feb. 17, 1999 | (JP) | 11-038897 |
| Jan. 18, 2000 | (JP) | 12-009204 |

(51) Int. Cl.$^7$ .................................................. F16C 33/66
(52) U.S. Cl. .................................................. 384/462
(58) Field of Search ................................... 384/462, 464, 384/492, 569

(56) References Cited

U.S. PATENT DOCUMENTS

| 5,150,398 | * | 9/1992 | Nishioka et al. | 384/492 X |
| 5,741,762 | * | 4/1998 | Kahlman | 384/492 X |
| 5,904,426 | * | 5/1999 | Tsuru et al. | 384/462 |
| 6,102,576 | * | 8/2000 | Toyota et al. | 384/492 |

* cited by examiner

Primary Examiner—Thomas R. Hannon
(74) Attorney, Agent, or Firm—Sughrue, Mion, Zinn, Macpeak & Seas, PLLC

(57) ABSTRACT

A rolling bearing according to the present invention comprises an inner race 29, an outer race 31 and a plurality of balls 37 disposed therebetween. The inner race 29 has a raceway surface on its outer peripheral surface. The outer race 31 includes a raceway surface on its inner peripheral surface. The balls 37 are rotatably interposed between the raceway surfaces of the inner and outer races. A lubricant is enclosed in a space 41 formed between the raceways of the outer and inner races by an amount of 0.3% to 3% of the capacity of the space.

17 Claims, 8 Drawing Sheets

ROLLING BEARING

BACKGROUND OF THE INVENTION

The present invention relates to a rolling bearing suitable for use as a bearing for, for example, a swing arm which is provided in a magnetic disk apparatus and swings minutely at a high speed.

A swing arm for a magnetic disk apparatus is required to swing minutely at a high speed in order that a magnetic head disposed at the leading end of the swing arm is able to seek a target track on a magnetic disk at a high speed and with high accuracy. To realize such high-speed and minute swing motion, there is used a rolling bearing in the base end swing portion of the swing arm. FIG. 9 is a section view of a swing arm base end which is supported by a conventional rolling bearing. On the inside portion of a casing 1 for an actuator (for example, a voice coil motor) which carries out a high-speed and minute swinging motion, there is threadedly mounted a base plate 3; and, the lower end of a support shaft 5 is fitted with and fixed to one end of the base plate 3. Also, the upper end of the support shaft 5 is threadedly mounted on the casing 1 by a screw 6 which extends through the casing 1.

On the outer periphery of the support shaft 5, there are disposed a pair of ball bearings (rolling bearings) 7 in such a manner that they are spaced apart from each other in the axial direction of the support shaft 5. Each of the ball bearing 7 is disposed in such a manner that its inner race is fixed to the support shaft 5 and its outer race is fixed to a housing 9. To the outer periphery of the housing 9, there is fixed the base end of a swing arm 11, while the swing arm 11 is swingably supported on the support shaft 5 through the ball bearings 7. At the leading end of the swing arm 11, there is disposed a magnetic head (not shown). Also, on the outer periphery of the housing 9, there is disposed a voice coil portion 13, while the voice coil portion 13 is situated in a magnetic field which is formed by two permanent magnets 15 disposed within the housing 9. Accordingly, in case where a given current is caused to flow in the voice coil portion 13 by a magnetic circuit, there is applied a rotational force to thereby swing the swing arm 11 by a given amount.

By the way, into the ball bearing 7 of this type, there is enclosed lubricant such as lubricating oil or grease for the purpose of lubrication. Conventionally, the amount of enclosure of the lubricant into the ball bearing is generally set in the range of 10 to 20% of the capacity of a space formed in the inside portion of the ball bearing.

Also, conventionally, the two ball bearings 7, 7, into which grease is enclosed as lubricant, are respectively given a pre-load (that is, an axial load applied to a bearing to thereby adjust a clearance between a rolling element and inner and outer races in order to prevent the shaft of the bearing from swinging as well as prevent the rolling element from slipping, swinging and generating noises) before they are put into practical use. And, as shown in FIG. 10, adhesives are applied to the peripheries of inner race inside diameter surfaces 7a, 7a and outer race outside diameter surface 7b, 7b, so that the two ball bearings 7, 7 can be bonded and fixed to the support shaft 5 and housing 9. Also, the both side surfaces of each of the ball bearings 7, 7 can be normally sealed through seal members 73. By the way, conventionally, the pre-load is generally set in the range of 300 gf to 800 gf.

In recent years, as the magnetic disk apparatus becomes highly dense, the magnetic disk apparatus is required that a spacing between the magnetic head and magnetic disk is as narrow as possible. Due to this, for the reliability of the magnetic disk apparatus, control of contamination becomes more and more important. Especially, since the swing arm is disposed adjacent to the magnetic disk surface, the swing arm is required that it is as free as possible from the contamination. For this reason, for the ball bearing, there are needed lubricant and lubricating method which can reduce the evaporation and scattering of the lubricant further than the conventional lubricant and lubricating method.

On the other hand, the track width of the magnetic disk has been made narrower and narrower, which requires the swing arm to speed up its access to the target track and enhance the accuracy of its positioning operation. This in turn requires the ball bearing, which supports the swing arm, that it can prevent an increase in torque as well as a sudden variation in the torque (torque spike).

However, the conventional ball bearing for a swing arm generally aims at extending its life and enclosing thereinto a large amount of grease in the range of 10 to 20% of the capacity of the space formed in the inside portion of the ball bearing. Therefore, in the conventional ball bearing, there are necessary various devices to eliminate a fear that outgases can be generated due to the evaporated or scattered grease, and a fear that such outgases can stick to the surface of the magnetic disk. Also, in case where the grease enclosure amount is increased for enhancement of the durability of the bearing, the viscosity and mixing resistance of the grease increase to thereby cause the torque to vary and increase.

SUMMARY OF THE INVENTION

The present invention aims at eliminating the drawbacks found in the conventional rolling bearings. Accordingly, it is an object of the invention to provide a rolling bearing which, while preventing fretting wear occurring when lubricant is small in amount, can keep torque from increasing or varying and can prevent contaminations from being produced due to the evaporation and scattering of the lubricant.

In attaining the above object, according a first aspect of the invention, there is provided a rolling bearing structured such that, in the inner peripheral surface of an outer race and the outer peripheral surface of an inner race, there are formed raceway surfaces respectively and, between these raceway surfaces, there are interposed a plurality of rolling elements, whereby the inner and outer races are assembled to each other through the rolling elements, wherein, in a space formed between the raceways of the outer and inner races, there is enclosed lubricant in an amount of 0.3% to 3% of the capacity of the space.

In the present rolling bearing, in the space formed between the raceways of the outer and inner races, there is enclosed the lubricant and the lubricant enclosure amount is set in the range of 0.3–3% of the capacity of the space. Due to this, there can be secured a proper amount of lubricant. The proper amount of lubricant can prevent not only the early fretting wear of the bearing surfaces as well as the damage of raceway surfaces and rolling elements which are easy to occur in case of the lubricant enclosure amount of less than 0.3%, but also the evaporation and scattering of the lubricant as well as the increase and variation in the torque which are easy to occur in case of the lubricant enclosure amount of more than 3%. Therefore, in case where a rolling bearing according to the invention is used as a bearing for a swing arm provided in a magnetic disk apparatus, the high-speed and high-accuracy operation of the swing arm can be realized with reduced contaminations.

Also, according to a second aspect of the invention, there is provided a rolling bearing, wherein a seal member for closing an annular clearance of the above-mentioned space opened on the two end faces of the above-mentioned outer and inner races may be fixed to either of the outer race or inner race.

In the present rolling bearing, the annular clearance of the above-mentioned space opened on the two end faces of the outer and inner races is sealed by the seal member, thereby being able not only to prevent foreign objects from invading the inside portion of the bearing from outside but also to prevent the lubricant enclosed in the space from evaporating and scattering to the outside. This not only can extend the life of the rolling bearing but also can reduce the contaminations that are involved with the evaporation and scattering of the lubricant.

In achieving the above object, according to a third aspect of the invention, there is provided a rolling bearing structured such that, in the inner peripheral surface of an outer race and the outer peripheral surface of an inner race, there are formed raceway surfaces respectively and, between these raceway surfaces, there are interposed a plurality of rolling elements, whereby the inner and outer races are assembled to each other through the rolling elements, wherein, at least on the raceway surfaces of the outer and inner races and the surfaces of the rolling elements, there is formed a coating or a thin film obtained by diluting and vacuum drying oil.

In the present rolling bearing, the coating or thin film obtained by diluting and vacuum drying oil is formed on the raceway surfaces and the surfaces of the rolling elements, which can reduce the evaporation and scattering of the lubricant as well as can reduce the viscosity and mixing resistance of the lubricant to a great extent to thereby prevent the torque from increasing or varying, when compared with the conventional rolling bearing in which lubricating oil or grease is enclosed. Therefore, in case where a rolling bearing according to the invention is used as a bearing for a swing arm provided in a magnetic disk apparatus, the high-speed and high-accuracy operation of the swing arm can be realized with reduced contamination.

Also, according a fourth aspect of the invention, there is provided a rolling bearing, wherein a seal member for closing an annular clearance of the above-mentioned space opened on the two end faces of the above-mentioned outer and inner races may be fixed to either of the outer race or inner race.

In the present rolling bearing, the annular clearance of the above-mentioned space opened on the two end faces of the outer and inner races is sealed by the seal member, thereby being able not only to prevent foreign objects from invading the inside portion of the bearing from outside but also to prevent the lubricant enclosed in the space from vaporating and scattering to the outside. This not only can extend the life of the rolling bearing but also can reduce the contaminations that are involved with the evaporation and scattering of the lubricant.

Further, according to a fifth aspect of the invention, there is provided a method for forming a lubricating oil film for a rolling bearing which is structured such that an inner race is disposed on the inner periphery of an outer race, there are raceway surfaces respectively on the inner peripheral surface of the outer race and on the outer peripheral surface of the inner race, there are interposed a plurality of rolling elements between these raceway surfaces, and the inner and outer races are free to rotate with respect to each other through the rolling elements, the method comprising the steps of: pouring a previously diluted lubricating oil onto the raceway surfaces and the surfaces of the rolling elements; rotating the inner and outer races with respect to each other to thereby apply the lubricating oil onto the raceway surfaces and the surfaces of the rolling elements; and, vacuum drying the rolling bearing with the lubricating oil applied thereon to thereby form a coating or a thin film on the raceway surfaces and the surfaces of the rolling elements.

According to the present rolling bearing lubricating oil film forming method, after the diluted lubricating oil is poured, it is dried. Due to this, a step of pouring a very small amount of lubricating oil can be realized easily. Also, by vacuum drying the lubricating oil, when compared with a method in which lubricating oil is thermally treated, the coating or thin film can be formed at an inexpensive manufacturing cost.

According to a sixth aspect of the invention, there is provided a rolling bearing, wherein diluted oil is vacuum dried to thereby form a coating or a thin film at least on the raceway surfaces and sliding surfaces of the bearing surfaces, and a seal member or a shield member (a sealing plate) serving as a sealing device is not provided on the side surfaces of said rolling bearing to thereby provide the rolling bearing as an open product. In particular, according to the present aspect of the invention, there is provided a rolling bearing for a swing arm, wherein diluted and vacuum dried oil is used to form a coating or a thin film at least on the raceway surfaces and sliding surfaces of the bearing surfaces. That is, the present invention relates to a structure for coating lubricating oil on the raceway surfaces with which balls serving as rolling elements can be contacted. The portions that can be contacted by the balls serving as the rolling elements are the raceway surfaces and the sliding surfaces of the pocket surfaces of retainers; and thus, the present invention relates to a structure for coating the lubricating oil onto these surfaces. Therefore, the present structure can be applied not only to the ball bearing but also to a roller bearing which uses rollers as rolling elements.

According to a seventh aspect of the invention, there is provided a rolling bearing, wherein lubricating oil (fluorine-containing oil or ester-containing oil) is diluted with a highly volatile alternative Freon, is poured onto the raceway surfaces of the inner and outer races of the rolling bearing and is dried at a temperature of the order of 80 to 120° C. under vacuum conditions for about 0.5 to 3 hours; after then, the inner and outer races are respectively pressure inserted into and fixed to a support shaft and a housing according to a resonance pressure insertion method; and, due to the rotation of the rolling bearing, there is formed a coating not only on the raceway surfaces of the inner and outer races serving as the contact surfaces of the inner and outer races but also on sliding surfaces which are the contact surfaces of the pocket surfaces of the retainers with rolling elements, while the enclosure amount of the lubricating oil is set in the range of 0.3 to 3% of the capacity of a space formed in the inside portion of the rolling bearing.

According to the present invention, in case where the diluted oil (lubricating oil) is vacuum dried to thereby form a coating or a thin film on, of the bearing surfaces, at least the raceway surfaces and sliding surfaces, the evaporation and scattering of the lubricant can be reduced when compared with the conventional rolling bearing in which grease is used as lubricant. Also, since the oil is easy to enter the contact surfaces which are moving and is excellent in oil film forming property and in repairing property, the level of torque can be reduced as well as variations in the torque can be reduced.

Further, in case where a seal plate or a shield plate serving as a sealing device is not provided on the side surfaces of the bearing to thereby form the bearing as an open product, the bearing can be cleaned in a state where it is assembled into a unit and in a state where the unit is mounted on a swing arm. That is, due to removal of the sealing device which has been conventionally an obstacle to cleaning, the cleaning of the bearing in a state where it is assembled into a unit and in a state where the unit is mounted on a swing arm can be facilitated, resulting in the positive cleaning (enhanced purity) of the bearing. Thanks to this, after the bearing is assembled, a final cleaning operation can be enforced on the bearing to thereby enhance the purity thereof. Also, since the number of steps of cleaning the bearing in the bearing assembling process can be reduced, the manufacturing cost of the bearing can be decreased.

According to a seventh aspect of the invention, there is provided a rolling bearing apparatus, comprising:

an inner race portion for supporting a rolling element from inside of the center of rotation in a freely rollable manner;

an outer race portion for supporting a rolling element from outside of the center of rotation in a freely rollable manner; and, a rolling element interposed between said inner and outer race portions, wherein oil is used as lubricant applied between the inner and outer race portions and the rolling element, and a pre-load to be applied to the rolling bearing apparatus is set in the range of 50 to 200 gf.

In the present rolling bearing apparatus, since oil is used as the lubricant and the pre-load is set in the range of 50 to 200 gf, not only the structure of the rolling bearing apparatus can be made simple and inexpensive, but also the level of torque can be decreased and control on variations in the torque can be promoted while reducing the evaporation and scattering of the lubricant, when compared with the conventional rolling bearing apparatus in which grease is used as lubricant and a pre-load is set in the conventional range.

That is, while restricting the deterioration of the bearing apparatus caused by use of the oil as the lubricant as much as possible, the torque level can be decreased and torque variation control can be promoted, which makes it possible to speed up the position control of the bearing apparatus as well as enhance the accuracy thereof. Thanks to this, there can be provided a rolling bearing apparatus suitable for use in a portion which swings minutely at a high speed, and thus there can be provided a rolling bearing apparatus suitable for use in a high-performance swing arm.

DETAILED DESCRIPTION OF THE PREFERRED EMBODIMENTS

Now, description will be given below in detail of the preferred embodiments of a rolling bearing according to the invention with reference to the accompanying drawings.

Figure 1:
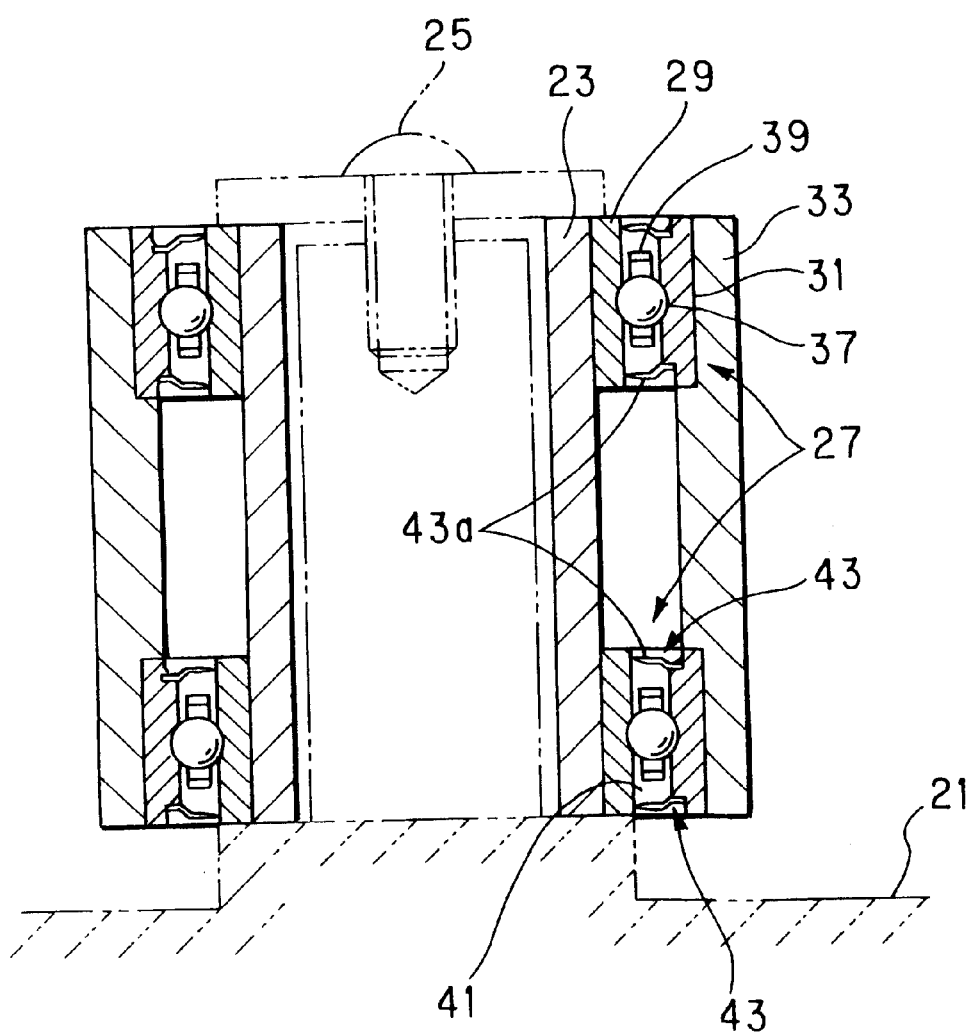
FIG. 1 is a section view of a swing portion of a swing arm which is disposed a magnetic disk apparatus and incorporates therein a rolling bearing according to a first embodiment of the invention.
Figure 2:
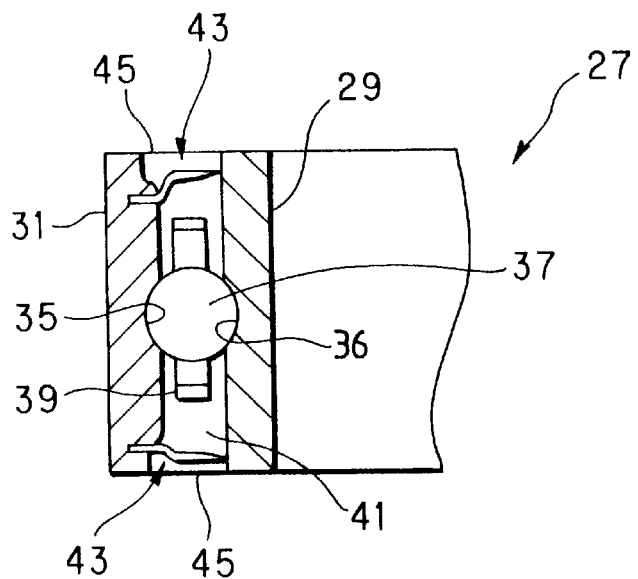
FIG. 2 is an enlarged view of the main portions of a rolling bearing shown in FIG. 1.

FIG. 1 is a section view of a swing portion of a swing arm which is disposed in a magnetic disk apparatus and incorporate therein a rolling bearing according to a first embodiment of the invention, and FIG. 2 is an enlarged view of the main portions of a rolling bearing shown in FIG. 1.

To the inside portion of a casing 21 for an actuator (for example, a voice coil motor) which is capable of carrying out a high-speed and minute swinging motion, there is fixed the lower end of a support shaft 23, while the upper end of the support shaft 23 is threadedly mounted on the casing 21 by a screw 25 which extends through the casing 21.

On the outer periphery of the support shaft 23, there are disposed a pair of ball bearings (rolling bearings) 27 in such a manner that they respectively extend in the axial direction of the support shaft 23. Each of the ball bearings 27 is disposed in such a manner that its inner race 29 is pressure fixed to the support shaft 23 and its outer race 31 is pressure inserted into and fixed to a housing 33. To the outer periphery of the housing 33, there is fixed the base end of a swing arm (not shown), while the swing arm is swingably supported on the support shaft 23 through the ball bearings 27.

As shown in FIG. 2, on the inner peripheral surface of the outer race 31 and the outer peripheral surface of the inner race 29 of the ball bearing 27, there are formed raceway surfaces 35 and 36 respectively. Between the two raceway surfaces 35 and 36, in the circumferential direction thereof, there are interposed a plurality of balls 37 which serve as rolling elements. Also, between the outer race 31 and inner race 29, there is interposed an annular-shaped retainer 39 in such a manner that it holds the rolling elements in a rotatable manner. That is, the outer race 31 and inner race 29 are assembled to each other through the balls 37 in such a manner that they can be rotated with respect to each other.

Between the inner peripheral surface of the outer race 31 and the outer peripheral surface of the inner race 29 of the ball bearing 27, there is formed a space 41 in which the balls 37 and retainer 39 are stored. Into this space 41, there is enclosed oil or grease which serves as lubricant. Referring to the amount of enclosure of the lubricant, it has been confirmed by an experiment (which will be discussed later) conducted by the present inventors that, in case where the lubricant enclosure amount is equal to or less than 0.3% of the capacity of the space 41, early fretting is easy to occur as well as the raceway surfaces and rolling elements can be damaged easily. Also, another experiment (which will also be discussed later) conducted by the present inventors has found that, in case where the lubricant enclosure amount is equal to or more than 3% of the capacity of the space 41, evaporation or scattering of the lubricant is easy to occur as well as torque increase or variation is easy to occur.

Note that "a space" in this specification means a space which is defined between the inner peripheral surface of the outer race and the outer peripheral surface of the inner race of the ball bearing in the radial direction of the bearing and also between both of the seal members in the axial direction of the bearing but deducting the volume of the rolling elements and the retainer therefrom. On the other hand, in a bearing wherein any of seal members are not provided, "a space" is directed to an imaginary space which is defined between the inner peripheral surface of the outer race and the outer peripheral surface of the inner race of the ball bearing in the radial direction of the bearing and also between both of imaginary seal members in the axial direction of the bearing but deducting the volume of the rolling elements and the retainer therefrom.

Therefore, in the space 41 of the ball bearing 27 according to the present embodiment, there is enclosed lubricant the amount of which occupies 0.3 to 3% of the capacity of the space 41. Further, to control the outgas down to a low level, it has been also confirmed that the upper limit of the lubricant enclosure amount may be preferably 2% or less of the space capacity.

As the lubricant, preferably, there may be used urea-containing grease, fluorine-containing grease, ester-containing oil, or fluorine-containing oil which oozes little. Also, to control the outgas down to a low level, preferably, there may be used fluorine-containing grease or fluorine-containing oil which provides a high affinity.

The lubricant such as grease or oil is previously enclosed by pouring it into at least one of the raceway surface between the ball 37 and inner race 29, the raceway surface between the ball 37 and outer race 31, and the raceway between the ball 37 and the pocket surface of the retainer 39. This is because the lubricant can be transferred over the whole of the sliding surface of the bearing due to the early rotation or swinging motion of the bearing, that is, in case where the lubricant is previously poured into at least one of the raceway surfaces, the lubricant can be later distributed over the whole of the sliding surface in the end.

As a method for enclosing the lubricant when the lubricant is oil, there can be employed a method called a dipping method in which the oil is previously applied thinly. And, there may also be employed an oil plating method. Or, there may also be used a lubricant applying method in which a coating or a thin film is formed.

As the material of the ball 37, there is used normal bearing steel or stainless steel. As in a bearing for a swing arm, it has also been confirmed that, when the swing arm swings minutely (tracks) while seeking the range of about 30° at random, use of the bearing steel or stainless steel as the ball material does not raise any practical problem as to the durability of the random seeking (that is, even if the random seeking is executed several hundred million times or more, no fretting wear can be caused), provided that the enclosure amount of the lubricant is in the range of 0.3 to 3% of the space capacity. By the way, in such a use where the durability of seeking in a given area is taken into account, it is more preferable to use ceramics having high hardness as the material of the ball 37, because fretting wear can be reduced further.

As a method for fixing the inner race 29 and outer race 31 of the ball bearing 27 to the support shaft 23 and housing 33, there is used a so called resonance pressure insertion method in which the inner race 29 is pressure inserted while it is being vibrated and a resonant frequency is measured on the outer race 31 side to thereby pre-load control the inner and outer races. This pressure insertion method provides a more preferable fixing method not only from the viewpoint of a measure against the contaminations of the magnetic disk surface due to the outgas caused by adhesives but also because the resonance (rigidity) of the inner and outer races can be uniformed. By the way, the inner race 29 and outer race 31 of the ball bearing 27 may also be fixed to the support shaft 23 and housing 33 by adhesives respectively.

Also, to reduce the generation of the outgases of the lubricant and the oozing of the lubricant, preferably, the two sides of the ball bearing 27 may be sealed by seal members 43 respectively. The seal members 43 are fixed to one of the outer and inner races 31 and 29 and are used to seal their respective annular clearances 45 in the space 41 which is opened on the two end faces of the outer and inner races 31 and 29. By the way, the seal members 43 may be one-side seal members: that is, the inside seals 43a of the two seal members 43 shown in FIG. 1 may be omitted, because omission of the inside seals 43a has no ill influence on the generation of the outgases.

In the thus structured ball bearing 27, the lubricant is enclosed into the space 41 formed between the inner peripheral surface of the outer race 31 and the outer peripheral surface of the inner race 29, while the enclosure amount of the lubricant is set in the range of 0.3 to 3% of the capacity of the space 41. Due to this, not only the early fretting or wear of the ball bearing and the damage of the raceway surfaces and rolling elements which are easy to occur when the lubricant enclosure amount is less than 0.3% can be prevented, but also the evaporation and scattering of the lubricant and the increase and variation of the torque which are easy to occur when the lubricant enclosure amount is more than 3% can be prevented.

Also, the annular clearances 45 in the space 41 which is opened on the two end faces of the outer and inner races 31 and 29 are respectively sealed off by the seal members 43, which not only prevents foreign objects from entering the inside portion of the ball bearing from outside but also prevents the lubricant enclosed in the space 41 from evaporating and scattering into the outside. Thanks to this, the life of the ball bearing 27 can be extended as well as the contamination caused by the evaporation and scattering of the lubricant can be reduced.

Therefore, according to above-structured the ball bearing 27, not only early fretting can be prevented, but also the evaporation and scattering of the lubricant as well as the increase and variation of the torque can be prevented: that is, the ball bearing 27 can provide an effect that, while preventing generation of the contamination, the high-speed and high-accuracy operation of the swing arm can be realized.

By the way, in the above-mentioned first embodiment, description has been given of an example in which the ball bearing 27 is used a rolling bearing. However, a rolling bearing according to the invention can also provide a similar effect to the above-mentioned ball bearing 27 even when a roller bearing is used as a rolling bearing.

Next, description will be given below of the results of a swing endurance test conducted on the rolling bearing of the invention.

Figure 6:
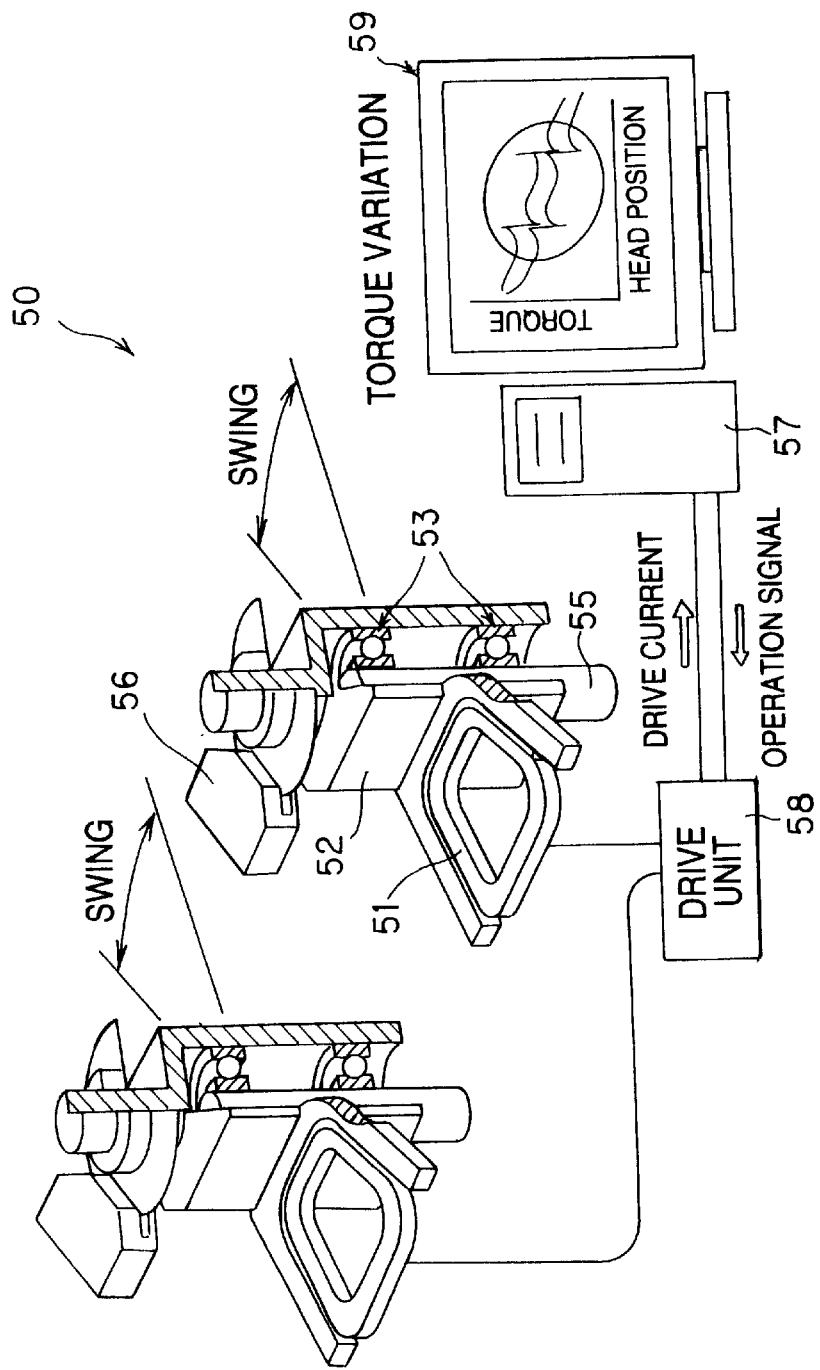
FIG. 6 shows a perspective view of a swing endurance test apparatus using a voice coil motor.

In FIG. 6, there is shown a swing endurance test apparatus 150 using a voice coil motor which was used in the present swing endurance test. The swing endurance test apparatus 150 is structured in the following manner: that is, the outer race of a test bearing 153 is fixed to the inner peripheral surface of a housing 152 with a voice coil motor 151 mounted thereon, and the inner race of the test rolling bearing 153 is fixed to a support shaft 155, while a rotary encoder 156 for detecting the rotation angle is mounted on the housing 152.

The voice coil motor 151 is the same type as a motor which is used in a magnetic disk apparatus, and can be driven by a drive unit 158 in accordance with an operation signal from a computer 157 to drive or swing the outer race of the test rolling bearing 153 through the housing 152. And, such swinging operation is carried out repeatedly, the variations in a torque (drive current) with passage of time in the repeated swinging operations are measured and displayed on a monitor 159.

Generally, in case where fretting wear is caused in a rolling bearing, a torque variation starts to occur; and, as the fretting wear progresses further, the torque variation increases. When the rolling bearing is applied in a magnetic disk apparatus, such fretting wear soon causes a positioning control error.

As the swing motion, there are employed two kinds of swing motion: that is, one is given area seeking motion, and the other is random seeking motion. In case of the given area seeking motion in which a swing angle is small, because the position of a rolling element is limited to a minute area, there are given severe conditions as a fretting wear endurance test. However, in the magnetic disk apparatus, actually, there is employed the random seeking motion and, therefore, here, a test for the random seek swing motion is conducted.

The test conditions of the random seeking swing motion endurance test are as follows:

(1) test bearing: ball bearing for swing arm (bearing inside diameter is 6.35 mm, bearing outside diameter is 9.525 mm, width is 3.15 mm)

(2) number of times of swing motion: several hundred thousand to several hundred million (3) swing angle: random seeking of 26°–1°

(4) swing frequency: 30 Hz (5) ambient temperature: room temperature (25° C.)

Figure 7A:
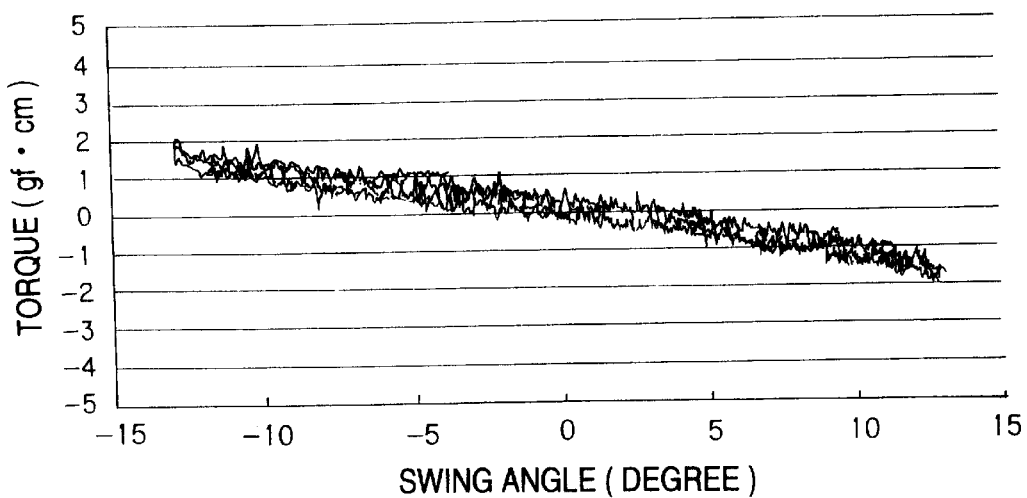
FIG. 7(a) and FIG. 7(b) are torque variations with respect to an swing angle when the ball bearing is swung.
Figure 7B:
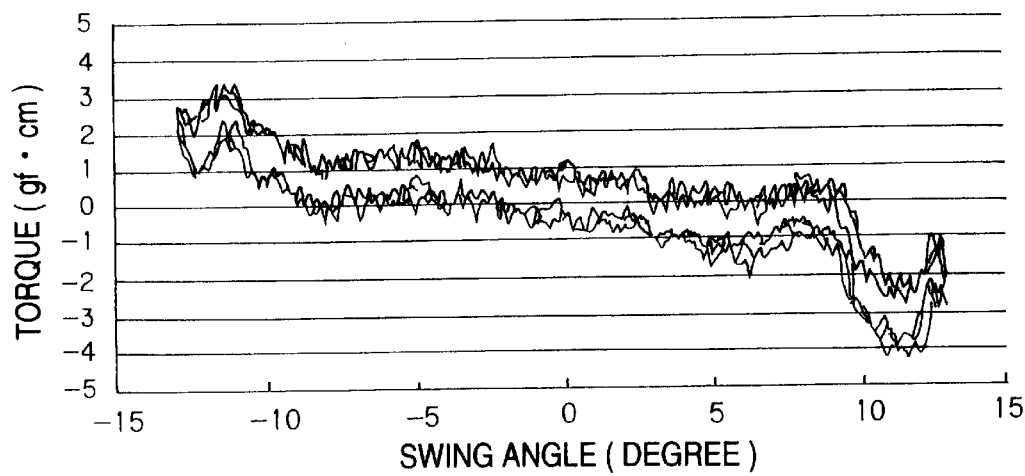

In FIG. 7, there are shown variations in the torque value with respect to the swing angle when the ball bearing is swung. FIG. 7A shows the torque variations in the initial condition of the ball bearing, whereas FIG. 7B shows the torque variations in a condition where the ball bearing comes to the limit of use.

As shown in FIG. 7, in the initial condition, in the respective swing angles, regardless of the swing directions, there are shown an almost constant torque value: that is, as the swing angle varies, the torque value varies. However, in the use limit condition, not only the torque value varies according to the swing directions, but also there are caused waves in the torque value variations according to the swing angles, thereby increasing the torque variations.

Figure 8:
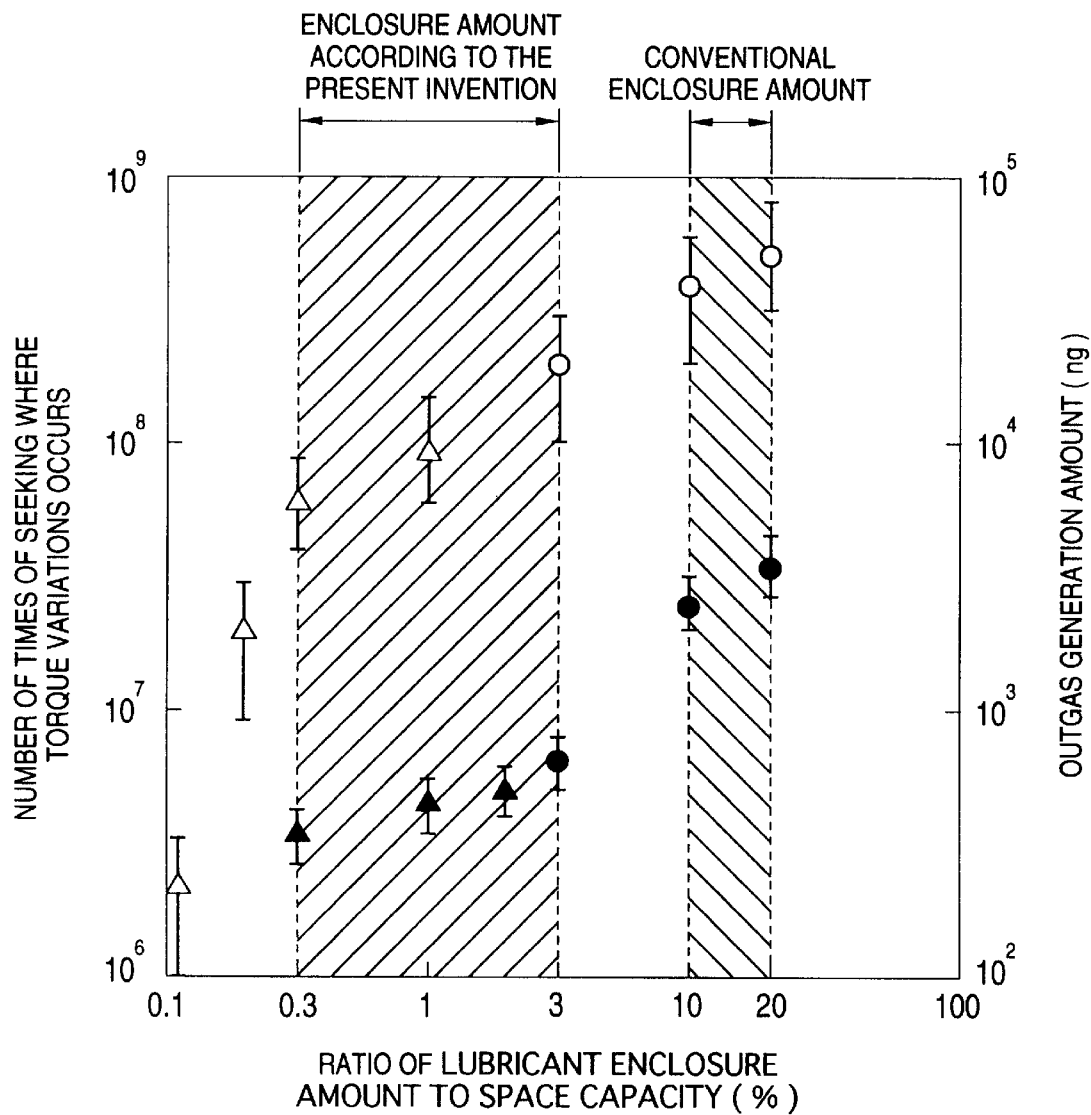
FIG. 8 shows the results of the swing endurance test.
Figure 9:
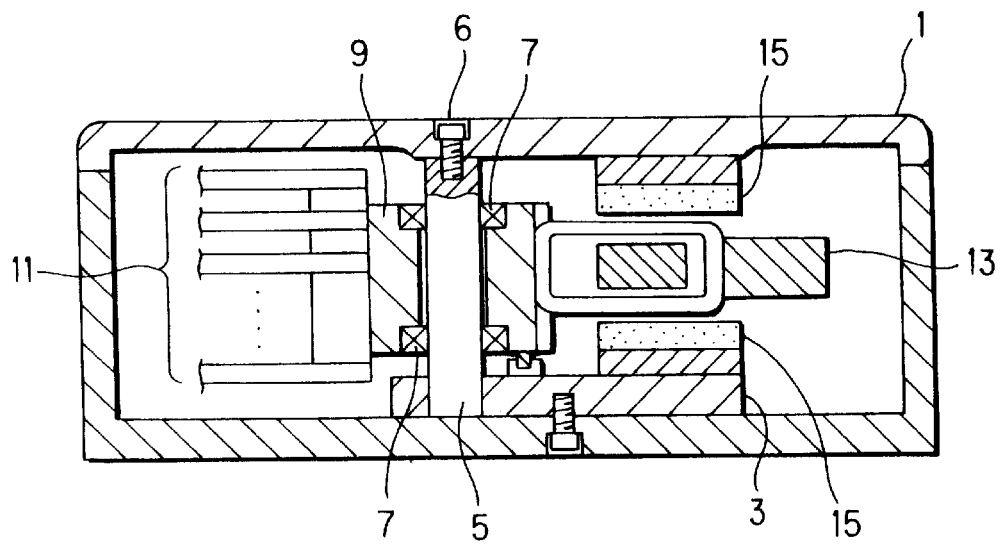
FIG. 9 is a section view of a swing portion of a swing arm for a magnetic disk apparatus incorporating a conventional rolling bearing.
Figure 10:
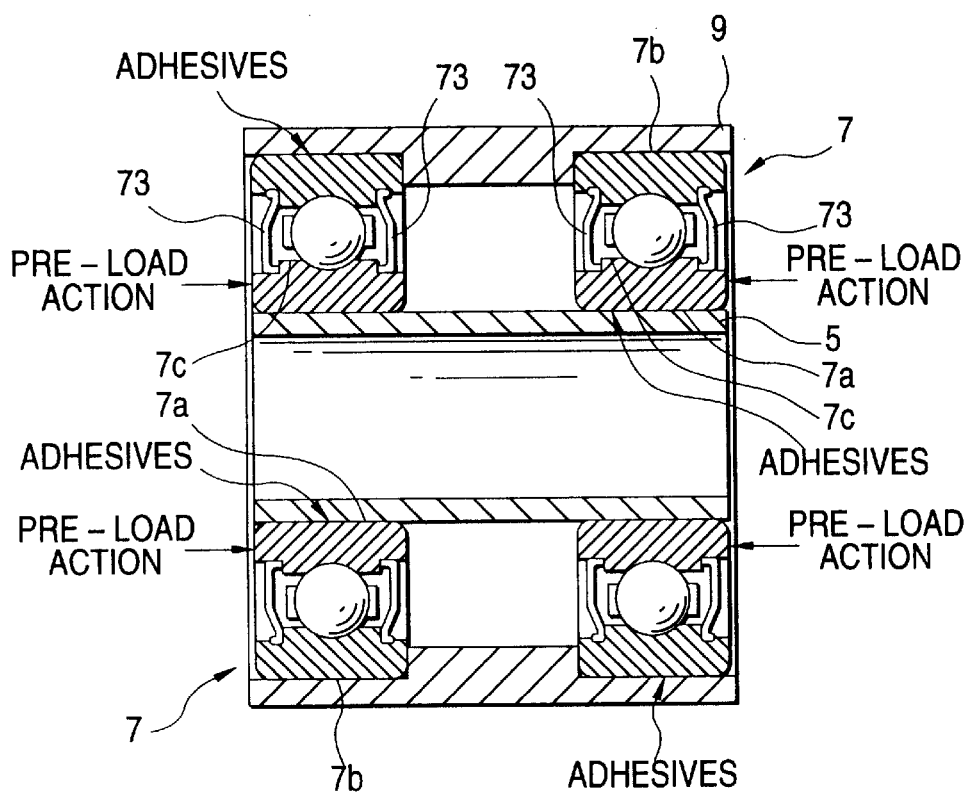
FIG. 10 is a section view of the structure of a conventional ball bearing.

Next, description will be given below of the results of a swing motion endurance test conducted on rolling bearings which are different from one another in the lubricant enclosure amounts thereof. FIG. 8 shows the results of this swing motion endurance test. In FIG. 8, the horizontal axis shows the space capacity ratios of the enclosure amounts of the lubricant, whereas the vertical axis shows the number of time of seeking where the torque variation occurs (the left vertical axis) and the amounts of outgases generated (the right vertical axis); and, the results include not only a case in which the lubricant is grease but also a case in which the lubricant is oil.

Here, the outgas measuring conditions are shown below:

(1) test bearing: ball bearing for swing arm (bearing inside diameter is 6.35 mm, bearing outside diameter is 9.525 mm, width is 3.15 mm)

(2) measuring device: gas chromatograph mass analyzing device manufactured by company, GC-MS (3) measuring temperature: 70° C.

(4) measuring time: 3 hours

According to the test results shown in FIG. 8, in case where the space capacity ratio of the lubricant enclosure amount is 0.3% or more, there is obtained a level which raise no special practical problem as to the number of times of seeking before the torque variation occurs. On the other hand, in case of less than 0.3%, the torque variation occurs in a small number of times of seeking, which raises a problem practically.

Also, the outgas generation amount, in case where the space capacity ratio of the lubricant enclosure amount is 0.3% or less, provides a very small amount of $10^3$ [ng] or less. On the other hand, in case of more than 3%, the outgas generation amount increases to thereby raise a practical problem.

From the above test results, it has been confirmed that, by setting the space capacity ratio of the lubricant enclosure amount in the range of 0.3 to 3%, the outgas generation amount can be controlled without causing the torque variation. That is, by setting the ratio in the above range, not only fretting wear in the early stage can be prevented but also the evaporation and scattering of the lubricant as well as the increase and variation of the torque can be prevented.

Now, description will be given below in detail of a second embodiment of a rolling bearing according to the invention with reference to the accompanying drawings. In the second embodiment, parts having the same structures or having the same functions as those used in the first embodiment are given the same reference characters and thus the duplicate description thereof is omitted here.

Figure 3:
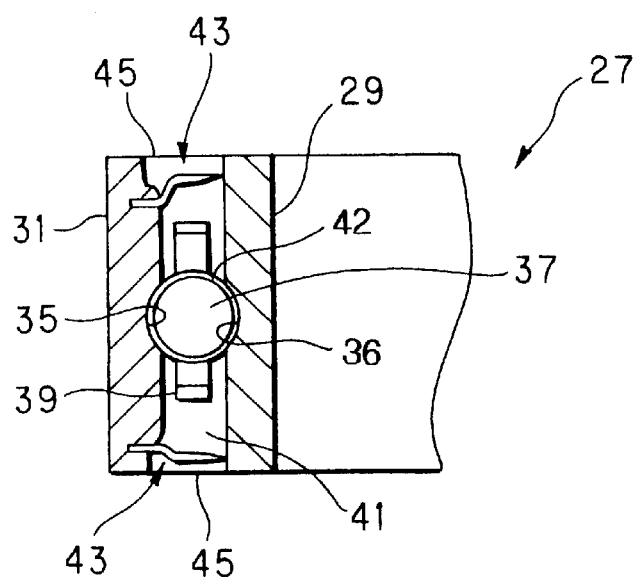
FIG. 3 is an enlarged view of the main portions of a rolling bearing according to the second embodiment of the invention.

As shown in FIG. 3, between the inner peripheral surface of an outer race 31 and the outer peripheral surface of an inner race 29 of a ball bearing 27, there is formed a space 41 in which balls 37 and a retainer 39 are stored. On the raceway surfaces 35, 36 and on the surfaces of the balls 37 disposed in the space 41, there is formed a coating object or a thin film (in the present embodiment, a thin film 42) which is a lubrication oil film obtained by vacuum drying a diluted lubricant (lubrication oil). Referring to the amount of the lubricant, as described before, it has been confirmed that, in case where the lubricant enclosure amount is 0.3% or less of the capacity of the space 41, early fretting wear as well as damaged raceway surfaces and rolling elements are easy to occur. Also, as described before, it has been confirmed that, in case where the lubricant enclosure amount is 3% or more of the capacity of the space 41, the evaporation and scattering of the lubricant as well as torque increase and variation are easy to occur.

Therefore, the thin film 42 disposed in the ball bearing 27 according to the present embodiment is formed in such a manner that its volume is in the range of 0.3% to 3% of the capacity of the space 41. Further, to control the generation of the outgases down to a low level, it has been confirmed that the upper limit of the volume of the thin film 42 may preferably be 2% or less of the capacity of the space 41.

As the lubricating oil used to form the thin film 42, preferably, there may be used ester-containing oil or fluorine-containing oil which oozes little. Also, to control the generation of the outgases down to a low level, more preferably, there may be used fluorine-containing oil which is high in affinity.

To form the thin film 42, at first, onto the raceway surfaces 35, 36 and the surface of the ball 37, there is poured lubricating oil which is previously diluted (10 to 200 times)

with a diluted solution. Next, the inner race 29 and outer race 31 are rotated with respect to each other to thereby apply the lubricating oil over the raceway surfaces 35, 36 and the surface of the ball 37. The lubricating oil is previously poured and enclosed into at least one portion of the following surfaces, that is, rolling surfaces such as the raceway surfaces 35, 36 and the surface of the ball 37, and the sliding surfaces of the ball 37 and the pocket surface of the retainer 39. The reason why the lubricant need simply to be poured into at least one portion is that the lubricant can be transferred afterwards to the whole of these surfaces due to the rotation operation of the bearing which will be executed later. After then, the whole of the rolling bearing with the lubricating oil applied thereto is vacuum dried to thereby form the thin film 42 on the raceway surfaces 35, 36 and the surface of the ball 37. By the way, to enclose the lubricating oil and form the thin film 42, alternatively, the lubricating oil is treated by the dipping method to thereby form an oil plate and, after then, the oil plate is vacuum dried to thereby form the thin film 42.

As the above-mentioned diluted solution, preferably, there may be used alternative Freon which is highly volatile (for example, a trade name AK255). Also, as the vacuum drying condition, preferably, there may be used a temperature of the order of 80 to 120° C. and the time for 0.5 to 3 hours.

According to this lubricating oil film (thin film 42) forming method, since, after the diluted lubricating oil is poured, it is dried under vacuum conditions, a very minute amount of lubricating oil can be poured easily. Also, because the lubricating oil is vacuum dried, the thin film 42 can be formed at an inexpensive manufacturing cost when compared with a method in which lubricating oil is processed by heating.

In the present embodiment, the thin film 42 is formed on the rolling surfaces and sliding surfaces. Alternatively, preparatory treatment, for example, coupling, may be previously enforced on the rolling surfaces and sliding surfaces and, after then, the coating or the thin film 42 may be formed. In this method, affinity can be enhanced further to thereby make it difficult for the thin film 42 to remove or peel off. By the way, here, the term "coating" means all formed objects (for example, minute solid oil pieces which are produced when a film is divided into individual small areas to form independent island-shaped objects), except for a thin film which is formed by drying diluted lubricant under vacuum conditions.

According to the thus structured ball bearing 27, since the thin film 42 formed by vacuum drying the lubricating oil is formed on the raceway surfaces 35, 36 and on the surface of the ball 37, when compared with the conventional ball bearing in which lubricating oil or grease is enclosed, the evaporation and scattering of the lubricating oil can be reduced and, at the same time, the viscosity and mixing resistance of the lubricant can also be reduced to a great extent to thereby be able to eliminate the increase and variation of torque.

Also, because the annular clearances 45 in the space 41 which is opened on the two end faces of the outer and inner races 31 and 29 are respectively sealed off by the seal members 43, not only foreign objects can be prevented from entering the inside portion of the ball bearing from outside but also the lubricant enclosed in the space 41 can be prevented from evaporating and scattering into the outside. Thanks to this, the life of the ball bearing 27 can be extended as well as the contaminations caused by the evaporation and scattering of the lubricant can be reduced.

Therefore, according to above-structured the ball bearing 27, not only early fretting wear can be prevented, but also the evaporation and scattering of the lubricant as well as the increase and variation of the torque can be prevented: that is, the ball bearing 27 can provide an effect that, while preventing generation of the contaminations, the high-speed and high-accuracy operation of the swing arm can be realized.

By the way, in the above-mentioned second embodiment, description has been given of an example in which the ball bearing 27 is used a rolling bearing. However, a rolling bearing according to the invention can also provide a similar effect to the above-mentioned ball bearing 27 even when a roller bearing is used as a rolling bearing.

Now, description will be given below in detail of a third embodiment of a rolling bearing according to the invention with reference to the accompanying drawings. In the third embodiment, parts having the same structures or having the same functions as those used in the first or second embodiment are given the same reference characters and thus the duplicate description thereof is omitted here. In the present embodiment, as lubricating oil 15 serving as lubricant for ball bearings 11 and 12, there is used fluorine-containing oil which is high in affinity, while a vacuum drying condition is set such that the temperature is 100° C. and the time is two hours. And, as the lubricating oil, there can also be used or enclosed ester-containing oil or fluorine-containing oil which oozes little.

Figure 4:
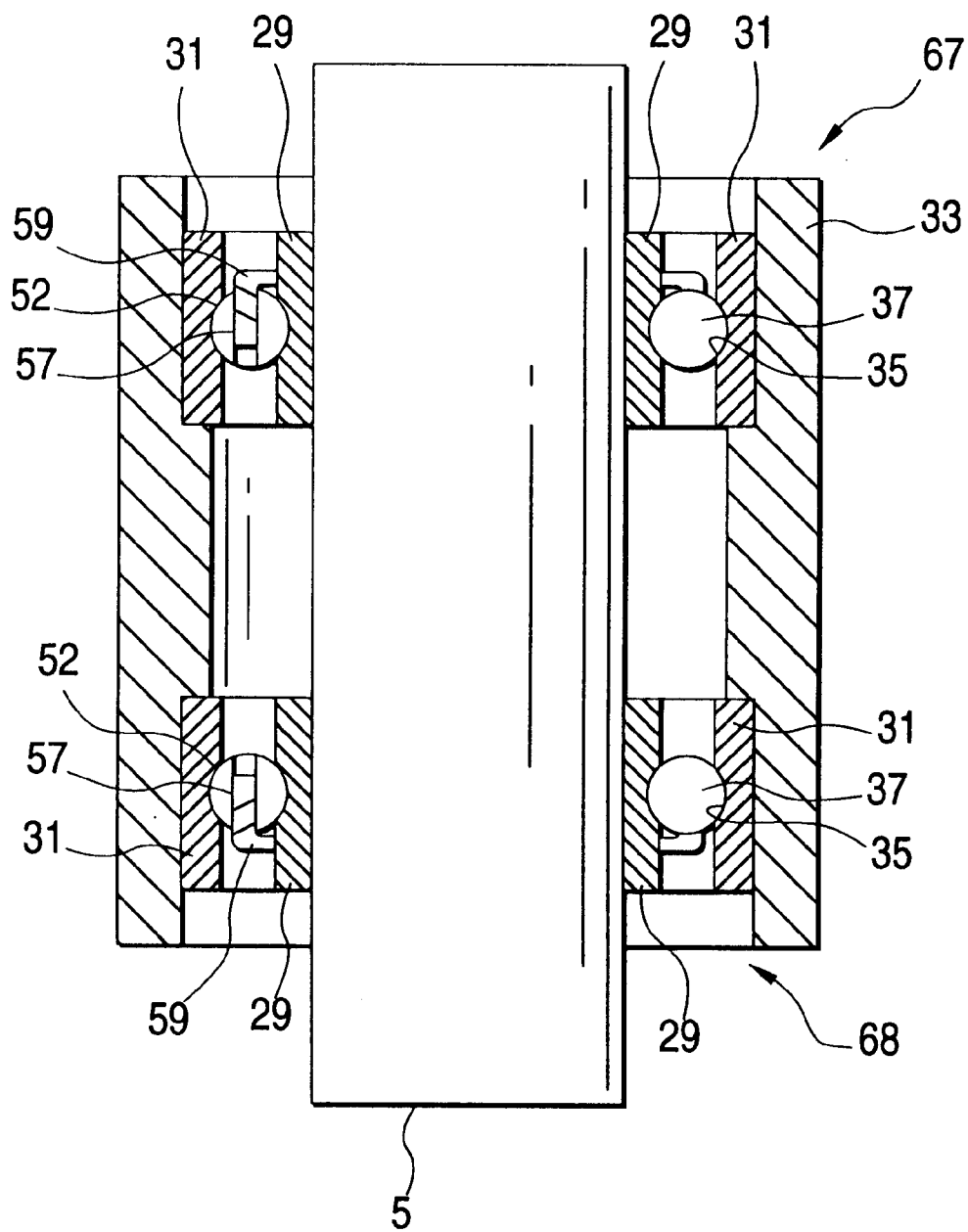
FIG. 4 is a section view of a rolling bearing for use in a swing arm according to a third embodiment of the invention.

Now, FIG. 4 is a section view of a rolling bearing for a swing arm according to the third embodiment of the invention. In a method for enclosing the lubricating oil 15 according to the present embodiment, before ball bearings 67 and 68 are assembled into a support shaft 5 and a housing 33, lubricating oil 52 previously diluted (10 to 20 times) with alternative Freon is poured into raceway surfaces 57 and 57 and, after then, the lubricating oil is dried under vacuum conditions (at a temperature of 100° C., for two hours) to thereby form a coating (or a thin film). In this manner, by vacuum drying the lubricating oil after diluted, a step of pouring a very minute amount of lubricating oil can be carried out easily. When compared with the conventional enclosing method in which lubricating oil is treated by heating to thereby form a coating or a thin film, the present vacuum drying method is able to reduce the manufacturing cost further. Also, in the present embodiment, the coating or thin film is formed on the material of the bearing; however, alternatively, preparatory treatment such as coupling may be previously enforced on the bearing material. In this case, the affinity of the coating or thin film is enhanced further to thereby make it difficult for the coating to peel off and remove. As another enclosing method, after an oil plating is formed by dipping, the oil plating may be then vacuum dried to thereby form a coating or a thin film.

As a method for fixing the inner races 29, 29 and outer races 31, 31 of the ball bearings 67, 68 respectively to the support shaft 5 and housing 33, there is used a so called resonance pressure insertion method in which the inner races 29, 29 are pressure inserted while they are being vibrated and the resonance frequency is measured on the outer race 31 (which is shown in the upper portion in FIG. 4) to thereby control the pre-load thereof. This resonance pressure insertion method is preferred because it can provide an advantage that not only it can facilitate a measure against the contamination of a magnetic disk due to the contaminations of the adhesives but also the resonance (rigidity) of the inner and outer races can be made uniform. Further, in case where the magnetic disk surface contamination measure is taken into account, it is also possible to employ a so called torque pressure insertion method in which the inner races 29, 29 are pressure inserted while they are being vibrated and the torque is measured on the outer race 31 (which is shown in the upper portion in FIG. 4) to thereby control the pre-load thereof. By the way, the inner races 29, 29 and outer races 31, 31 of the ball bearings can also be fixed respectively to the support shaft 5 and housing 33 using adhesives.

The lubricating oil 52 enclosed in the ball bearings 67 and 68 lubricates the raceway surfaces 35, 35 and sliding surfaces 57, 57 of the ball bearings 67 and 68. Due to the early rotational movements or swinging movements of the ball bearings 67 and 68, the lubricating oil 52 enclosed in the ball bearings 67 and 68 is transferred not only to the raceway surfaces 35, 35 which are the contact surfaces of the ball bearings 67 and 68 with the balls 37 and 37 but also to the sliding surfaces 57, 57 which are the contact surfaces between the balls 37, 37 and the pocket surfaces of the retainers 59, 59. As a result of this, there is formed a coating or a thin film not only on the raceway surfaces 35, 35, on which the balls 37, 37 are contacted with the inner races 29, 29 as well as the balls 37, 37 are contacted with the outer races 31, 31, but also on the sliding surfaces 57, 57 of the pocket surfaces of the retainers 59, 59.

In the present embodiment, with the contamination and fretting wear taken into account, the enclosure amount of the lubricating oil 52 is set for 1.5% of the capacity of a space formed in the bearing. The enclosure amount of the lubricating oil 52 as the lubricant of the ball bearings 67 and 68 must be in the range of 0.3% to 3% of the capacity of the space formed in the bearing. The reason for this is as follows: that is, the upper limit of the lubricating oil enclosure amount must be 3% or less, more preferably, 2% or less in order to control the contamination down to a low level. On the other hand, in a no-lubricated condition or in a dry condition of less than 0.3%, the lubricating oil is difficult to be introduced onto the raceway surfaces 35, 35, which causes the raceway surfaces 35, 35 to fret or wear in an early stage. Therefore, the lower limit of the enclosure amount is set for 0.3%.

As the material of the ball, there is used normal bearing steel or stainless steel. As in a bearing for a swing arm, when the swing arm swings minutely (tracks) while seeking the range of about 30° at random, use of the bearing steel or stainless steel as the ball material does not raise any practical problem as to the durability of the random seeking (that is, even if the random seeking is executed several hundred million times or more, no fretting or wear can be caused) in case where the enclosure amount of the lubricant is in the range of 0.3 to 3% of the space capacity. By the way, in such a use where the durability of seeking in a given area is taken into account, more preferably, as the material of the ball, there may be used ceramics which is high in hardness because ceramics is further more resistant against fretting or wear.

Also, in the present embodiment, because the lubricant does not generate outgases nor oozes out, the two side surfaces of each ball bearing are not shielded (that is, no sealing plate is disposed on the ball bearing side surfaces) and are left exposed to the outside. Thanks to this, the bearings can be cleaned while they are assembled into a unit and while the unit is mounted on the swing arm. Therefore, by enforcing a final cleaning on the bearings after they are assembled, the degree of the purity of the bearings can be enhanced. Also, by reducing the number of times of the cleaning steps during a process for assembling the bearings, the manufacturing costs of the bearings can be reduced.

Now, description will be given below of a fourth embodiment of a rolling bearing according to the invention with reference to the accompanying drawings.

Figure 5:
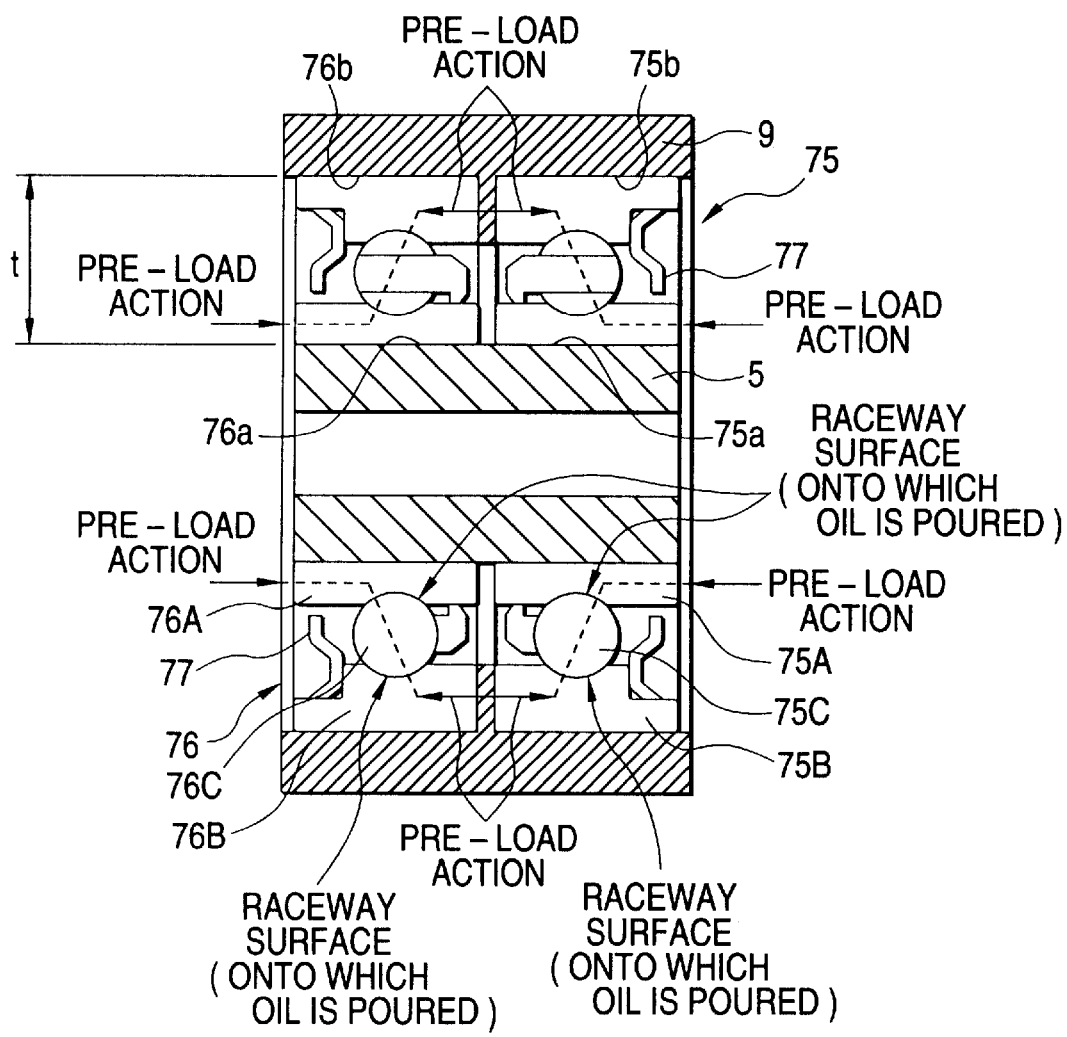
FIG. 5 is section view of the structure of a ball bearing according to a fourth embodiment of the invention.

FIG. 5 shows a rolling bearing apparatus according to the fourth embodiment of the invention. By the way, the general structure (the structures of shafts, swing members, swing arm, and motor as well as the arrangements thereof) of the fourth embodiment is similar to that employed in the third embodiment and thus the description thereof is omitted here. Thus, description will be given below mainly of the different portions of the fourth embodiment from the third embodiment. Also, the same elements as those used in the third embodiment are given the same designations.

In FIG. 5, the inner races 75A, 76A of a pair of ball bearings 75, 76 are fitted with and held by (pressure inserted into and fitted with) the outer periphery of a support shaft 5, whereas the outer races 75B, 76B of the pair of ball bearings 75, 76 are fitted with and held by (pressure inserted into and fitted with) the inner peripheral surface of a swing member (housing) 9.

By the way, in the present embodiment, as shown in FIG. 5, as the lubricant for the two ball bearings 75, 76, there is used oil; and, a minute amount of oil is previously poured onto the raceway surfaces of the bearings. According to this oil lubrication, when compared with grease lubrication, the early scattering of the lubricant can be reduced and, at the same time, torque can be lowered and torque variation can be controlled. By the way, instead of pouring the oil onto the raceway surfaces, there can be employed another type of lubricating method, that is, a so called oil plating treatment method in which a minute amount of oil is previously applied onto the raceway surfaces thinly. As the oil serving as the lubricant of the bearings, there can be used ordinary lubricating oil and, preferably, there may be used ester-containing oil which is low in the evaporation property or fluorine-containing oil which is high in affinity, from the viewpoints of scattering resistance, evaporation resistance, and wear resistance as well as cost reduction.

Also, in the present embodiment, in order to reduce the size and weight of the bearing apparatus and thus the manufacturing cost thereof, as a seal member for the respective ball bearings 75 and 76, there is used a one-side seal member 77 which makes it possible to omit stepped portions 7c, 7c formed in ball bearings 7, 7 shown in FIG. 7, so that the t dimension (see FIG. 5) of the ball bearing can be decreased. By the way, in case where, as lubricating oil, for example, there are used ester-containing oil which is low in the evaporation property or fluorine-containing oil which is high in affinity, use of the one-side seal member is able to maintain the scattering resistance, evaporation resistance and wear resistance of the ball bearing in a desired level.

Also, similarly to the conventional seal member 73, there may be employed a double seal structure for sealing the two ends of the bearing, or an open structure in which no seal member is provided. However, in case of the open structure, there is necessary a separate seal structure. That is, both of the double seal structure and open structure are higher in the manufacturing cost than the one-side seal structure according to the present embodiment.

Now, in the present embodiment, as described above, since the inner races 75A, 76A of the ball bearings 75, 76 are fitted with and held by the outer periphery of a support shaft 5, whereas the outer races 75B, 76B of the ball bearings 75, 76 are fitted with and held by the inner peripheral surface of the swing member (housing) 9, it is possible to restrict a problem as to outgases, caused by adhesives when the inner and outer races are bonded and fixed using the adhesives as in the conventional ball bearings.

And, as an interference when the inner and outer races are pressure inserted, preferably, there may be used a diameter in the range of 1 μm to 12 μm. In case where the diameter is less than 1 μm, they cannot be fitted and held properly, thereby raising a fear that they can be moved out of position. On the other hand, in case where the diameter is more than 12 μm, the raceway surfaces can be deformed greatly, which raises a fear that the torque can vary.

Also, as a method for applying the pre-load (in the present embodiment, the pre-load, as shown in FIG. 5, acts between the side surfaces of the inner races 75A, 76A and the side surfaces of the outer races 75B, 76B (swing member 9) through the balls 75C, 76C serving as the rolling elements, there may be used a so called resonance pressure insertion method (resonance control method) in which the inner races 75A, 76A are pressure inserted while they are being swung and the resonance frequency is measured on the outer races 75B, 76B sides to thereby adjust (control) the pre-load, or a so called torque pressure insertion method (torque control method) in which the inner races 75A, 76A are pressure inserted while they are being swung and the torque is measured on the outer races 75B, 76B sides to thereby adjust (control) the pre-load.

In the resonance pressure insertion method, the resonance frequency can be made constant, that is, the rigidity can be made constant, whereas the torque is easy to vary. On the other hand, in the torque pressure insertion method, the torque can be made constant, whereas the resonance frequency (rigidity) is easy to vary.

Therefore, it is desirable to select either of the two methods according to cases, that is, depending on which of the resonance (rigidity) or torque precedes. However, in either of the methods, in case where there is employed a structure in which both of the inner and outer races are pressure inserted into and fixed to the support shaft 5 and swing member 2, the inner and outer races are to be bonded and fixed using adhesives as in the conventional ball bearings; and, in this case, there can be prevented a problem as to outgases caused by the adhesives.

By the way, referring to a method for setting the resonance frequency in the pressure insertion of the inner and outer races, the rigidity of the ball bearings 75 and 76 is found from the amount of the pre-load according to a conventional method, and the sum of the mass of the swing member 9 (including the swing arm 11) and the ball bearing outer races 75, 76 are previously obtained; and, after then, there can be set a desired resonance frequency from the relationship between the thus obtained rigidity and mass. In the present embodiment, the resonance frequency is set in such a manner that the pre-load amount is in the range of 50–200 gf. Thanks to this, when compared with the conventional pre-load amount range (30 gf–800 gf), the torque can be reduced further. By the way, in case of the pre-load of less than 50 gf, there is a fear that the pre-load can disappear in high temperatures. This is the reason why the lower limit of the pre-load may preferably be 50 gf.

By the way, in the present embodiment, description has been given of the structure in which both of the inner and outer races are respectively pressure inserted into and fixed to the support shaft 5 and swing member 9. However, this is not limitative but there may also be employed a structure in which adhesives are applied to the inner race inside diameter surfaces 75a, 76a and outer race inside diameter surfaces 75b, 76b and, after then, they are bonded and fixed to the support shaft 5 and swing member 9.

As described above, according to the rolling bearing of the present embodiment, since oil is used as the lubricant and the pre-load is set in the range of 50–200 gf, when compared with the conventional ball bearing in which grease is used as the lubricant and the pre-load is set in the conventional pre-load range, while reducing the evaporation and scattering of the lubricant, the torque reduction as well as the torque variation control can be promoted.

That is, while restricting the function deterioration due to use of oil as much as possible, the torque reduction as well as the torque variation control can be promoted, thereby being able to increase the speed and accuracy of the position control. Therefore, the present invention can provide a rolling bearing suitable for use in a portion which swings minutely at high speeds, and thus can provide a high-performance bearing apparatus for a swing arm.

By the way, in the above-mentioned embodiment, description has been given of the ball bearing. However, the present invention is not limited to this but the invention can also apply to all kinds of rolling bearing apparatus (including an angular type of rolling bearing apparatus) such as a roller bearing.

As has been described hereinbefore in detail, in a rolling bearing according to the invention, since lubricant is enclosed into a space formed between the raceway surface of an outer race and the raceway surface of an inner race and the enclosure amount of the lubricant is set in the range of 0.3 to 3% of the space capacity, not only early fretting wear occurring in case of the lubricant enclosure amount of 0.3% or less can be prevented, but also the evaporation and scattering of the lubricant as well as the increase and variation of the torque can be prevented. As a result of this, when the present rolling bearing is used as a bearing for a swing arm used in a magnetic disk apparatus, the high-speed and high-accuracy operation of the swing arm can be realized.

As has been described heretofore in detail, in a rolling bearing according to the invention, since a coating or a thin film obtained by vacuum drying diluted lubricating oil is formed at least on the raceway surfaces of inner and outer races and on the surface of a rolling element, when compared with the conventional rolling bearing in which lubricating oil or grease is enclosed as lubricant, not only the evaporation and scattering of the lubricant can be reduced but also the increase and variation of the torque can be eliminated. As a result of this, when the present rolling bearing is used as a bearing for a swing arm disposed in a magnetic disk apparatus, while preventing contamination, the high-speed and high-accuracy operation of the swing arm can be realized.

According to the invention, since oil is used as lubricant, and the oil is diluted and vacuum dried to thereby form a coating or a thin film on the raceway surfaces of inner and outer races and on the sliding surface of a rolling element, there can be provided a rolling bearing which, when compared with the rolling bearing in which grease is used as the lubricant, can reduce the evaporation and scattering of the lubricant as well as can reduce the level of torque and variations in the torque.

Also, in case where the present bearing is formed as an open product in which any seal and seal plate are not provided on the side surfaces of the bearing, the bearing can be cleaned while it is assembled to a unit or while the unit is mounted on a swing arm. Thanks to this, after assembly of the bearing, the final cleaning can be enforced on the bearing to thereby enhance the purity of the bearing; and, the number of cleaning steps in the bearing assembling process can be decreased to thereby reduce the cost of the bearing.

As has been described heretofore, according to the rolling bearing apparatus of the invention, because oil is used as lubricant and a pre-load is set in the range of 50 to 200 gf, when compared with the conventional bearing apparatus in which grease is used as the lubricant and a pre-load is set in the conventional pre-load range, while reducing the evaporation and scattering of the lubricant, torque reduction and torque variation reduction can be promoted.

That is, while restricting the deterioration of the function of the bearing due to use of the oil as the lubricant, the torque reduction and torque variation reduction can be promoted, thereby being able to increase the speed of the position control as well as enhance the accuracy thereof. Therefore, there can be provided a rolling bearing apparatus suitable for use in such a portion as swings minutely at high speeds, and thus there can be provided, for example, a bearing apparatus for a swing arm of high performance.

What is claimed is:

1. A rolling bearing comprising:

an inner race with a raceway surface on its outer peripheral surface;

an outer race with a raceway surface on its inner peripheral surface;

a plurality of rolling elements rotatably interposed between the raceway surfaces of said inner and outer races;

a retainer disposed between said inner and outer races for rotatably holding said rolling elements; and a lubricant enclosed in a space formed between said raceway surfaces of said outer and inner races by an amount of 0.3% to 3% of the capacity of said space.

2. The rolling bearing according to claim 1, wherein said lubricant is enclosed in said space is one of a lubricating oil and grease.

3. The rolling bearing according to claim 2, wherein said lubricant is selected from the group consisting of urea-containing grease, fluorine-containing grease, ester-containing oil and fluorine-containing oil.

4. The rolling bearing according to claim 2, further comprising:

a pair of seal members disposed at both ends of a space defined between said inner race and said outer race in an axial direction of the bearing.

5. The rolling bearing according to claim 4, wherein each of said seal members is attached to one of said inner and outer races.

6. The rolling bearing according to claim 1, wherein said lubricant is enclosed in said space while said lubricant is made in the form of a coating or a thin film which is formed at least on said raceway surfaces and on the surfaces of said rolling elements by vacuum drying a diluted lubricating oil.

7. The rolling bearing according to claim 6, wherein both ends of a space defined between said inner race and said outer race in an axial direction of the bearing is opened.

8. The rolling bearing according to claim 1, wherein said rolling bearing is used for a swing arm provided in a magnetic disk apparatus.

9. A rolling bearing comprising:

an inner race with a raceway surface on its outer peripheral surface;

an outer race with a raceway surface on its inner peripheral surface;

a plurality of rolling elements rotatably interposed between the raceway surfaces of said inner and outer races;

a retainer disposed between said inner and outer races for rotatably holding said rolling elements; and a coating or a thin film which is formed at least on said raceway surfaces and on the surfaces of said rolling elements by vacuum drying a diluted lubricating oil.

10. The rolling bearing according to claim 9, wherein said diluted lubricating oil is an amount of 0.3% to 3% of the capacity of a space between said raceways of said outer and inner races.

11. The rolling bearing according to claim 9, wherein both ends of a space defined between said inner race and said outer race in an axial direction of the bearing is opened.

12. The rolling bearing according to claim 9, wherein said rolling bearing is used for a swing arm provided in a magnetic disk apparatus.

13. A rolling bearing comprising:

an inner race with a raceway surface on its outer peripheral surface;

an outer race with a raceway surface on its inner peripheral surface;

a plurality of rolling elements rotatably interposed between the raceway surfaces of said inner and outer races;

a retainer disposed between said inner and outer races for rotatably holding said rolling elements; and a first film member which is formed at least on said raceway surfaces by vacuum drying a diluted lubricating oil.

14. The rolling bearing according to claim 13, wherein said retainer has a plurality of pockets within which said plurality of rolling elements are rotatably held respectively, and said rolling bearing further comprises a second film member which is formed by vacuum drying a diluted lubricating oil at least on sliding surface of each of said pockets where said pockets are brought in sliding contact with said rolling elements respectively.

15. The rolling bearing according to claim 14, wherein each of said rolling elements is a ball made of ceramics.

16. The rolling bearing according to claim 14, wherein both ends of a space defined between said inner race and said outer race in an axial direction of the bearing is opened.

17. The rolling bearing according to claim 14, wherein said rolling bearing is used for a swing arm provided in a magnetic disk apparatus.

* * * * *